United States Patent
Yang et al.

(10) Patent No.: US 10,240,514 B2
(45) Date of Patent: Mar. 26, 2019

(54) WATER-COOLED INTERCOOLER SYSTEM USING AIR CONDITIONING SYSTEM AND CONTROL METHOD THEREOF

(71) Applicant: Hyundai Motor Company, Seoul (KR)

(72) Inventors: Seng-Joo Yang, Whasung-Si (KR); Dang-Hee Park, Whasung-Si (KR); Jong-Wan Han, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 15/260,631

(22) Filed: Sep. 9, 2016

(65) Prior Publication Data

US 2017/0122188 A1 May 4, 2017

(30) Foreign Application Priority Data

Nov. 3, 2015 (KR) ........................ 10-2015-0153895

(51) Int. Cl.
*F02B 29/04* (2006.01)
*B60H 1/00* (2006.01)

(52) U.S. Cl.
CPC ..... *F02B 29/0443* (2013.01); *B60H 1/00271* (2013.01); *B60H 2001/00307* (2013.01); *Y02T 10/146* (2013.01)

(58) Field of Classification Search
CPC ............ F02B 29/0443; F02B 29/0425; B60H 1/00271; B60H 2001/00307; B60H 2001/003; B60H 1/3205; B60H 2001/3255; Y02T 10/146
USPC ........................................................ 60/599
See application file for complete search history.

(56) References Cited

U.S. PATENT DOCUMENTS

| | | | | |
|---|---|---|---|---|
| 4,480,439 | A * | 11/1984 | Yamane | F02B 29/0443 123/563 |
| 5,353,757 | A * | 10/1994 | Susa | F01P 3/20 123/41.29 |
| 5,875,633 | A * | 3/1999 | Lawson, Jr. | F01K 23/065 60/618 |
| 6,347,618 | B1 * | 2/2002 | Klem | F02B 29/0412 123/561 |
| 6,394,076 | B1 * | 5/2002 | Hudelson | F01P 9/06 123/41.31 |
| 6,748,934 | B2 * | 6/2004 | Natkin | F01P 9/06 123/563 |

(Continued)

FOREIGN PATENT DOCUMENTS

| | | | | |
|---|---|---|---|---|
| CN | 101419034 | A * | 4/2009 | ......... F28D 15/0275 |
| CN | 106988863 | A * | 7/2017 | |

(Continued)

Primary Examiner — J. Todd Newton
(74) Attorney, Agent, or Firm — Morgan, Lewis & Bockius LLP

(57) ABSTRACT

A water-cooled intercooler system using an air conditioning system, may include a water-cooled intercooler for cooling intake air compressed in a turbocharger by cooling water, a water pump for supplying the cooling water to the water-cooled intercooler, and a radiator of the water-cooled intercooler for cooling the cooling water by traveling wind or fan wind, wherein the intercooler system may include a bypass line allowing a condenser of the air conditioning system and a compressor of the air conditioning system to fluidly communicate with each other and passing through the interior of a surge tank of the radiator of the water-cooled intercooler.

7 Claims, 8 Drawing Sheets

(56) References Cited

U.S. PATENT DOCUMENTS

| | | | | |
|---|---|---|---|---|
| 2005/0081834 | A1* | 4/2005 | Perkins | F02B 29/0418 123/563 |
| 2006/0081225 | A1* | 4/2006 | Yi | F02B 29/0456 123/563 |
| 2006/0272622 | A1* | 12/2006 | Acuna, Sr. | F02B 29/0443 123/542 |
| 2009/0031999 | A1* | 2/2009 | Erickson | F02B 29/0443 123/563 |
| 2011/0146266 | A1* | 6/2011 | Weinbrenner | F02B 29/0412 60/599 |
| 2012/0018127 | A1* | 1/2012 | Iwasaki | F02B 29/0412 165/104.14 |
| 2012/0325181 | A1* | 12/2012 | Burke | F02B 29/0443 123/540 |
| 2014/0069603 | A1* | 3/2014 | Burke | B60H 1/00028 165/41 |
| 2014/0096560 | A1* | 4/2014 | Kim | F24F 7/007 62/426 |
| 2014/0360705 | A1* | 12/2014 | Kim | F28F 9/0234 165/140 |
| 2015/0306934 | A1* | 10/2015 | Oono | B60K 11/04 165/104.14 |
| 2016/0068041 | A1* | 3/2016 | Kim | B60H 1/00735 62/115 |
| 2016/0121694 | A1* | 5/2016 | Kim | B60H 1/08 62/160 |
| 2016/0230641 | A1* | 8/2016 | Honda | F02G 5/00 |
| 2017/0009715 | A1* | 1/2017 | Cho | F02M 35/10268 |
| 2017/0122186 | A1* | 5/2017 | Park | F02B 29/0406 |
| 2017/0211462 | A1* | 7/2017 | Chen | F02B 29/0443 |
| 2017/0254597 | A1* | 9/2017 | Renz | F28D 9/005 |

FOREIGN PATENT DOCUMENTS

| | | | | |
|---|---|---|---|---|
| DE | 19859129 A1 | * | 6/2000 | B60H 1/32 |
| JP | 62279228 A | * | 12/1987 | |
| JP | 63159123 A | * | 7/1988 | B60H 1/3204 |
| JP | 2005-112186 A | | 4/2005 | |
| JP | 2005-145204 A | | 6/2005 | |
| JP | 2005-297684 A | | 10/2005 | |
| JP | 2008-057950 A | | 3/2008 | |
| JP | 2010-169055 A | | 8/2010 | |
| JP | 2014141899 A | * | 8/2014 | |
| JP | 2015-086778 A | | 5/2015 | |
| KR | 1995-009398 Y1 | | 10/1995 | |
| KR | 0094280 Y1 | | 10/1995 | |
| KR | 10-2005-0028106 A | | 3/2005 | |
| KR | 101704340 B1 | * | 2/2017 | B60H 1/00271 |

* cited by examiner

WATER-COOLED INTERCOOLER SYSTEM USING AIR CONDITIONING SYSTEM AND CONTROL METHOD THEREOF

CROSS-REFERENCE TO RELATED APPLICATIONS

The present application claims priority to Korean Patent Application No. 10-2015-0153895 filed on Nov. 3, 2015, which is incorporated herein by reference in its entirety.

BACKGROUND OF THE INVENTION

Field of the Invention

Exemplary embodiments of the present invention relate to a water-cooled intercooler system using an air conditioning system and a method of controlling the intercooler system and more particularly, to a water-cooled intercooler system using the air conditioning system to enhance cooling efficiency of the water-cooled intercooler and a method of controlling the intercooler system.

Description of Related Art

In general, a turbocharger is a supercharging structure that compresses intake air to be supplied to an intake manifold of an engine by means of discharging force of exhaust gas and supplies the compressed intake air into cylinders so that it enhances efficiency of charging intake air of the engine and also increases a mean effective pressure and thereby increases output.

Such a turbocharger is of a structure that a conventional compressor and a turbine are arranged on a coaxial line, the turbine is forced to rotate by means of discharging force of exhaust gas discharged through an exhaust pipe and thus the compressor arranged on the coaxial line with the turbine is forced to rotate, and thereby inflow air flowing through an intake manifold is compressed and supplied into cylinders.

Meanwhile, since the air compressed by the turbocharger as described above is heated to a higher temperature, if such air is fed into combustion chambers as it is, an increasing rate of air density decreases and thus, it is likely to decrease the charging efficiency or cause knocking. It is an intercooler that is provided to lower temperature of the supercharged air. FIGS. 1 and 2 show diagrams for illustrating a conventional intercooler respectively. Referring to FIGS. 1 and 2, intake air cooled while passing through the intercooler is maintained at a high density and cooled down to a lower temperature and thereby combustion performance is increased.

The intercooler is typically divided into an air-cooled intercooler and a water-cooled intercooler depending on cooling types. The air-cooled intercooler is of a structure that the supercharged air is forced to be cooled by cold air passing through cooling pins formed integrally on a multiple of tubes while it passes through the multiple of tubes. On the contrary, the water-cooled intercooler is of a structure that the supercharged air is forced to be cooled by means of a coolant flow circuit that is in contact with the tubes.

In general, there is a problem that the air-cooled intercooler has good cooling efficiency, but it is difficult to expect stable efficiency due to changes in ambient temperature. Accordingly, a recent trend is that applications of the water-cooled intercooler are increased. However, there was a problem in the water-cooled intercooler in that although it can maintain stable efficiency, its cooling efficiency is lower than that of the air-cooled intercooler.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a water-cooled intercooler system using an air conditioning system to allow cooling water of the intercooler system to be cooled by means of refrigerant in a condensed liquid state of the air conditioning system, and a method of controlling the intercooler system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, the present invention provides a water-cooled intercooler system using an air conditioning system comprising a water-cooled intercooler 110 for cooling intake air compressed in a turbocharger by means of cooling water; a water pump 120 for supplying the cooling water to the water-cooled intercooler 110; and a radiator 130 of the water-cooled intercooler for cooling the cooling water by means of traveling wind or fan wind, characterized in that the water-cooled intercooler system comprises a bypass line 230 allowing a condenser 210 of the air conditioning system and a compressor 220 of the air conditioning system to fluidly communicate with each other and passing through the interior of a surge tank 131 of the radiator 130 of the water-cooled intercooler.

According to an exemplary embodiment of the present invention, the water-cooled intercooler system using the air conditioning system comprises a first valve 310 mounted in the bypass line 230 to open or close the bypass line 230.

According to an exemplary embodiment of the present invention, the water-cooled intercooler system using the air conditioning system comprises an expansion line 250 for allowing the condenser 210 of the air conditioning system and an expansion valve 240 to fluidly communicate with each other.

According to an exemplary embodiment of the present invention, the water-cooled intercooler system using the air conditioning system comprises a second valve 320 mounted in the expansion line 250 to open or close the expansion line 250.

According to an exemplary embodiment of the present invention, the water-cooled intercooler system using the air conditioning system comprises an evaporation line 270 for allowing the expansion valve 240 and a heat core 260 to fluidly communicate with each other.

According to an exemplary embodiment of the present invention, the water-cooled intercooler system using the air conditioning system comprises a compression line 280 for allowing the heat core 260 and the compressor 220 of the air conditioning system to fluidly communicate with each other.

According to an exemplary embodiment of the present invention, the water-cooled intercooler system using the air conditioning system comprises a condensation line 290 for allowing the compressor 220 of the air conditioning system and the condenser 210 of the air conditioning system to fluidly communicate with each other.

In accordance with another embodiment of the present invention, the present invention provides a method of controlling a water-cooled intercooler system using an air conditioning system, comprising steps of: determining whether indoor cooling is in the process of being carried out (S100); determining whether if the indoor cooling is in the process of being carried out, it is required to perform further cooling of cooling water of the water-cooled intercooler system (S200); and opening a first valve 310 and a second valve 320 when it is determined to require the further cooling of the cooling water of the water-cooled intercooler system (S300).

According to an exemplary embodiment of the present invention, the method of controlling a water-cooled intercooler system using an air conditioning system further comprises a second control step S400 of closing the first valve 310 and opening the second valve 320 when it is determined at the determining step S200 that the further cooling of the cooling water of the water-cooled intercooler system is required.

According to an exemplary embodiment of the present invention, the method of controlling a water-cooled intercooler system using an air conditioning system further comprises a third step S500 of opening the first valve 310 and closing the second valve 320 when it is determined, at the step S100 of determining whether the indoor cooling is in the process of being carried out, that the indoor cooling is not in the process of being carried out.

According to an exemplary embodiment of the present invention, the method of controlling a water-cooled intercooler system using an air conditioning system is characterized in that if temperature of intake air at an outlet of the water-cooled intercooler 110 is equal to or higher than a predetermined reference temperature at the determining step S200, it is determined that the further cooling of the cooling water of the water-cooled intercooler system is required.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
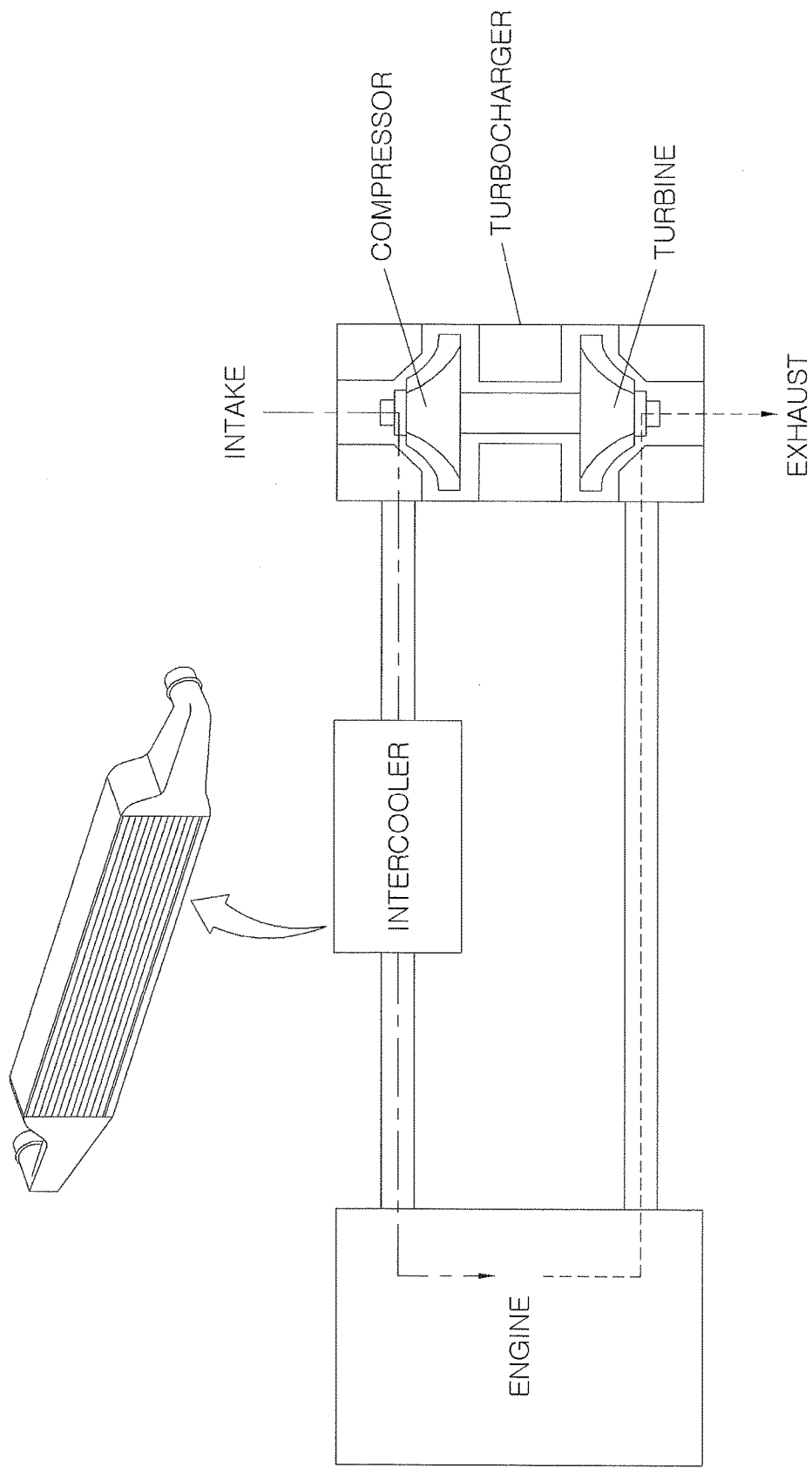
FIG. 1 and FIG. 2 are diagrams illustrating a conventional intercooler respectively.
Figure 2:
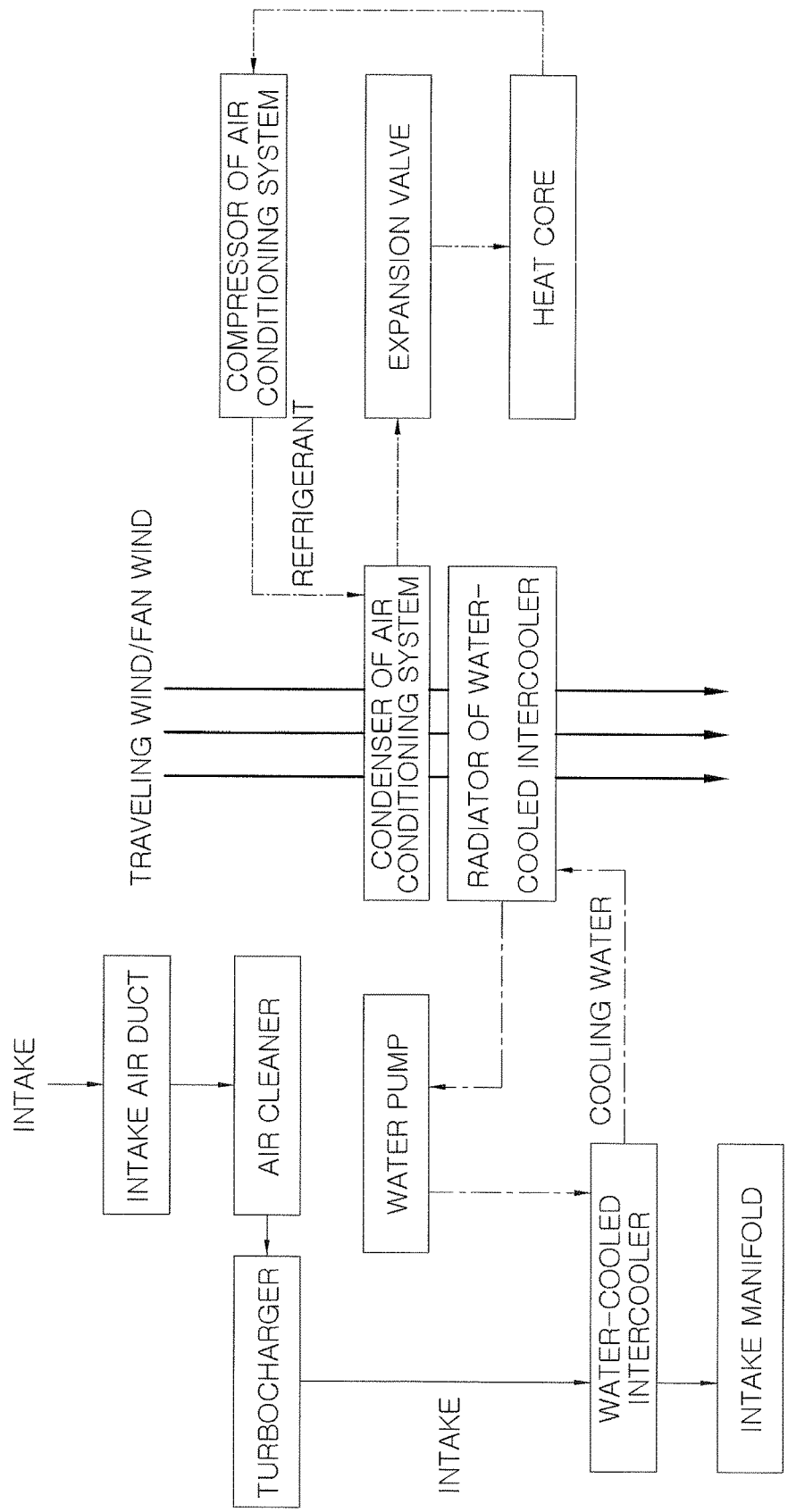

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms and words used in the specification and claims should not be construed as their ordinary or dictionary sense. On the basis of the principle that the inventor can define the appropriate concept of a term in order to describe his/her own invention in the best way, it should be construed as meaning and concepts for complying with the technical idea of the present invention. Accordingly, the embodiments described in the present specification and the construction shown in the drawings are nothing but one exemplary embodiment of the present invention, and it does not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of the present invention. Exemplary embodiments of the present invention will be described below in more detail with reference to the accompanying drawings.

Figure 3:
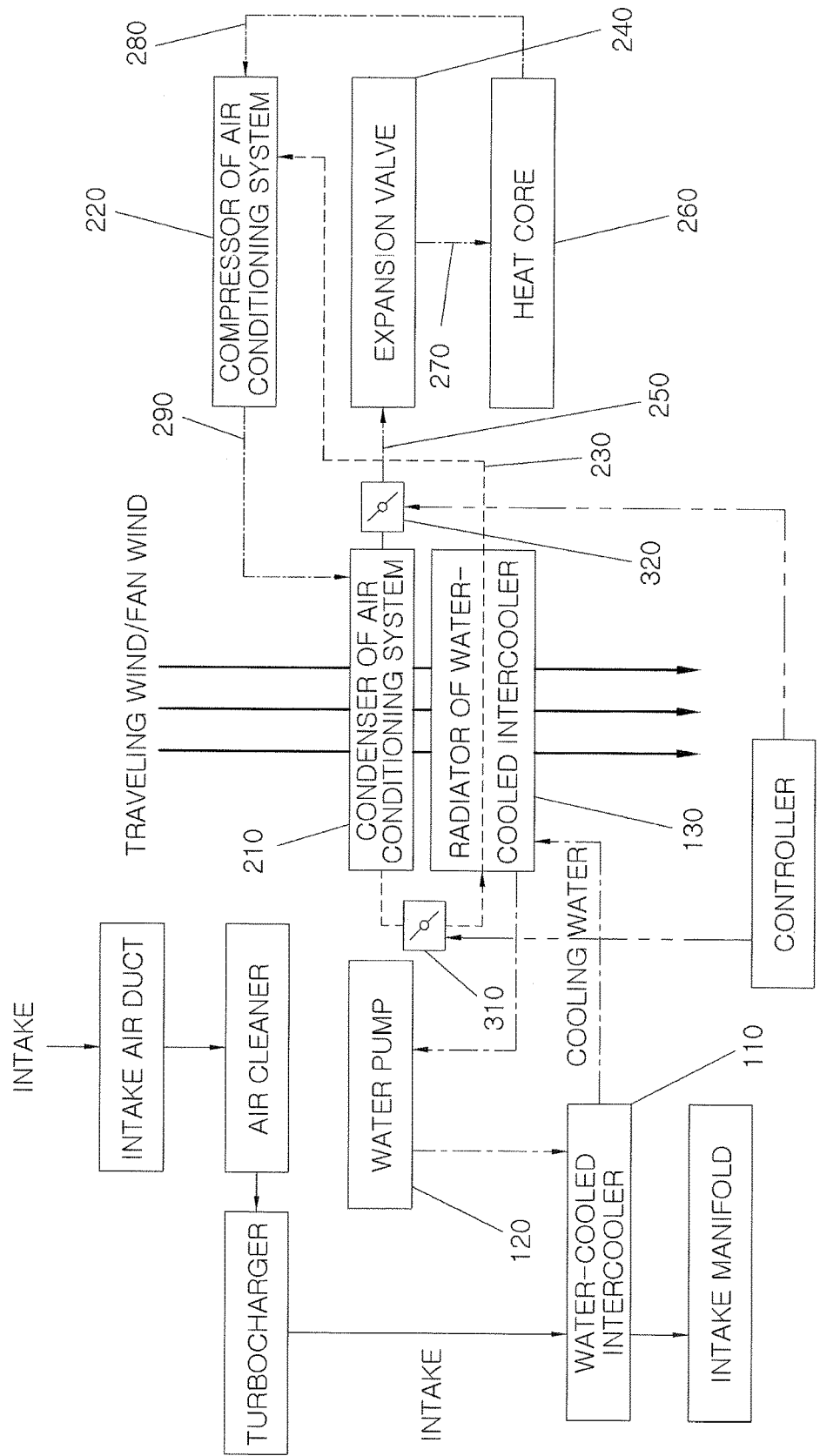
FIG. 3 is a block diagram of a water-cooled intercooler system using an air conditioning system according to an embodiment of the present invention.
Figure 4:
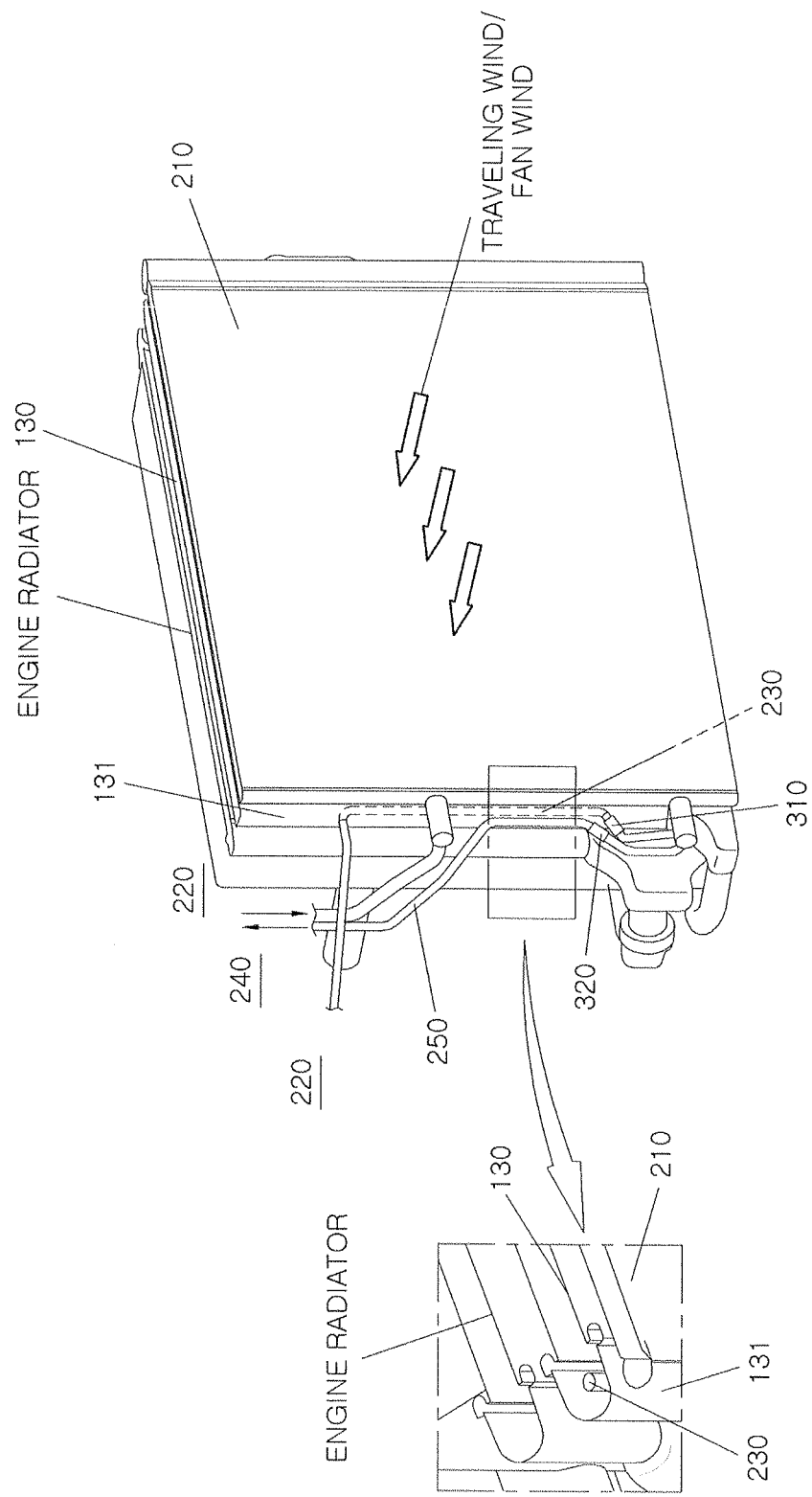
FIG. 4 is a perspective view and an enlarged perspective view of a water-cooled intercooler system using an air conditioning system according to an embodiment of the present invention.

FIG. 3 illustrates a block diagram of a water-cooled intercooler system using an air conditioning system according to an exemplary embodiment of the present invention and FIG. 4 illustrates a perspective view and an enlarged perspective view of a water-cooled intercooler system using an air conditioning system according to an exemplary embodiment of the present invention. Referring to FIGS. 3 and 4, a water-cooled intercooler system using an air conditioning system according to an exemplary embodiment of the present invention includes a water-cooled intercooler 110, a water pump 120, a radiator 130 of the water-cooled intercooler and a bypass line 230.

The water-cooled intercooler 110 serves to cool intake air compressed in a turbocharger by means of cooling water. The water pump 120 serves to supply cooling water to the water-cooled intercooler 110. The radiator 130 of the water-cooled intercooler serves to allow the cooling water to be cooled by traveling wind or fan wind.

In addition, the bypass line 230 is arranged to allow a condenser 210 of the air conditioning system and a compressor 220 of the air conditioning system to fluidly communicate with each other and pass through the interior of a surge tank 131 of the radiator 130 of the water-cooled intercooler. In this case, the condenser 210 of the air conditioning system serves to condense refrigerant (hereinafter, simply referred to "refrigerant") in a gaseous state under high pressure of the air conditioning system and change its phase to a liquid state, while the compressor 220 of the air conditioning system serves to compress refrigerant in a gaseous state under low pressure into a high pressure gaseous state.

In other words, heat exchange between the cooling water and the refrigerant is induced by allowing the refrigerant in a liquid state condensed in the condenser 210 of the air conditioning system to pass through the bypass line 230 within the surge tank 131 of the radiator 130 of the water-cooled intercooler. Accordingly, the cooling water of the radiator 130 of the water-cooled intercooler is primarily cooled through heat exchange with atmosphere by traveling wind or fan wind, and then further cooled secondarily by the refrigerant in a liquid state condensed in the condenser 210 of the air conditioning system. Therefore, with the bypass line 230 mounted, it is possible to increase cooling efficiency of the cooling water of the water-cooled intercooler 110 and ultimately increase efficiency of cooling intake air. Thereafter, the refrigerant of which heat has been exchanged while passing through the bypass line 230 is returned back to the compressor 220 of the air conditioning system.

The water-cooled intercooler system using the air conditioning system may include a first valve 310 mounted in the bypass line 230 to open or close the bypass line 230. In addition, the water-cooled intercooler system using the air-conditioning system may include an expansion line 250 allowing the condenser 210 of the air conditioning system and an expansion valve 240 to fluidly communicate with each other and a second valve 320 mounted in the expansion line 250 to open or close the expansion line 250. In this case, the expansion valve 240 serves to expand the refrigerant in a liquid state under high pressure so as to be easily vaporized. Further, the refrigerant in a liquid state condensed in the condenser 210 of the air conditioning flows within the expansion line 240.

That is, as the present invention utilizes the air conditioning system, it is necessary to constitute an operation manner in case where the air conditioning system is operated for indoor cooling differently from an operation manner in case where the air conditioning system does not do so. Therefore, the first valve 310 and the second valve 320 are mounted to open or close the bypass line 230 and the expansion line 250 respectively such that operation of the intercooler system at the time when indoor cooling is in the process of being carried out is performed differently from that at the time when the water-cooled intercooler system is cooled. Operation of the present invention will be described later.

The water-cooled intercooler system using the air conditioning system includes an evaporation line 270, a compression line 280, and a condensation line 290. The evaporation line 270 serves to allow the expansion valve 240 and a heat core 260 to fluidly communicate with each other. In this case, the heat core 260 serves to vaporize refrigerant in a liquid state and allows the external air around the heat core 260 to be cooled by means of an endothermic reaction at the time of vaporizing the refrigerant. At this time, the refrigerant in a liquid state compressed in the expansion valve 240 flows within the evaporation line 270.

In addition, the compression line 280 serves to allow the heater core 260 and the compressor 220 of the air conditioning system to fluidly communicate with each other. At this time, the refrigerant in a gaseous state vaporized in the heat core 260 flows within the compression line 280.

Further, the condensation line 290 serves to allow the compressor 220 of the air conditioning system and the condenser 210 of the air conditioning system to fluidly communicate with each other. At this time, the refrigerant in a gaseous state under high pressure compressed in the compressor 220 of the air conditioning system flows within the condensation line 290.

Figure 5:
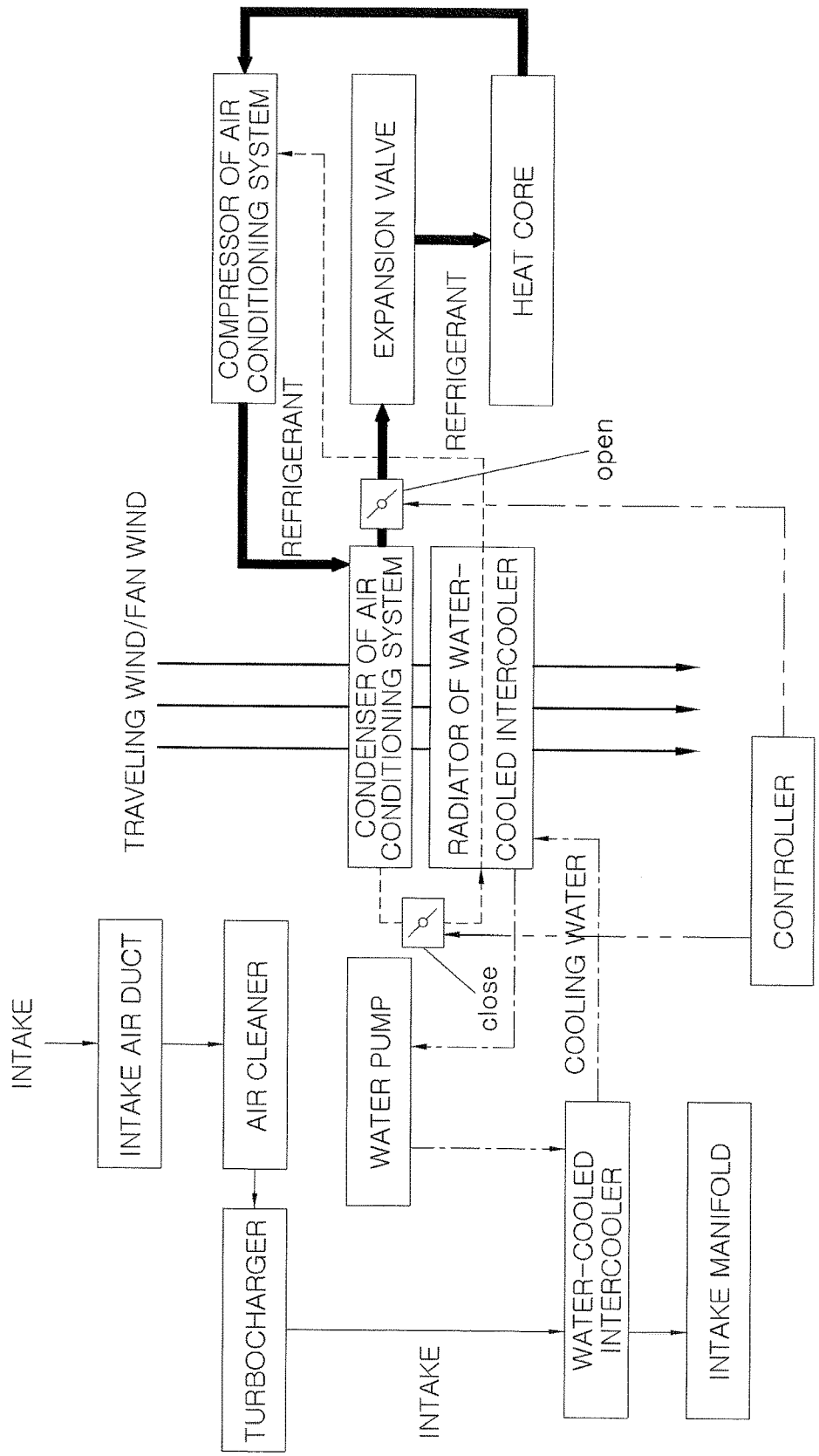
FIG. 5, FIG. 6 and FIG. 7 are diagrams illustrating operation state of a water-cooled intercooler system using an air conditioning system respectively according to an embodiment of the present invention.
Figure 6:
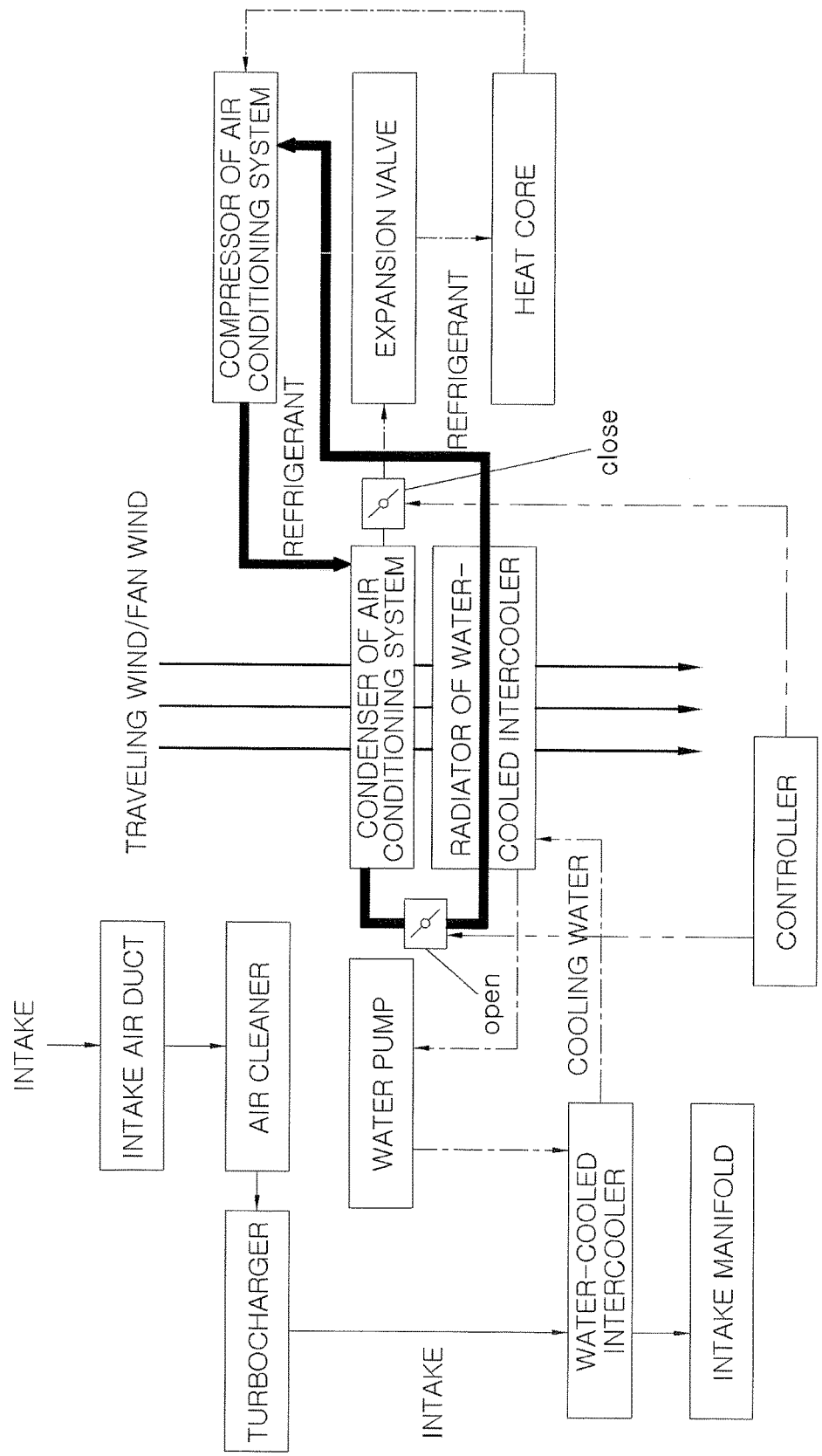
Figure 7:
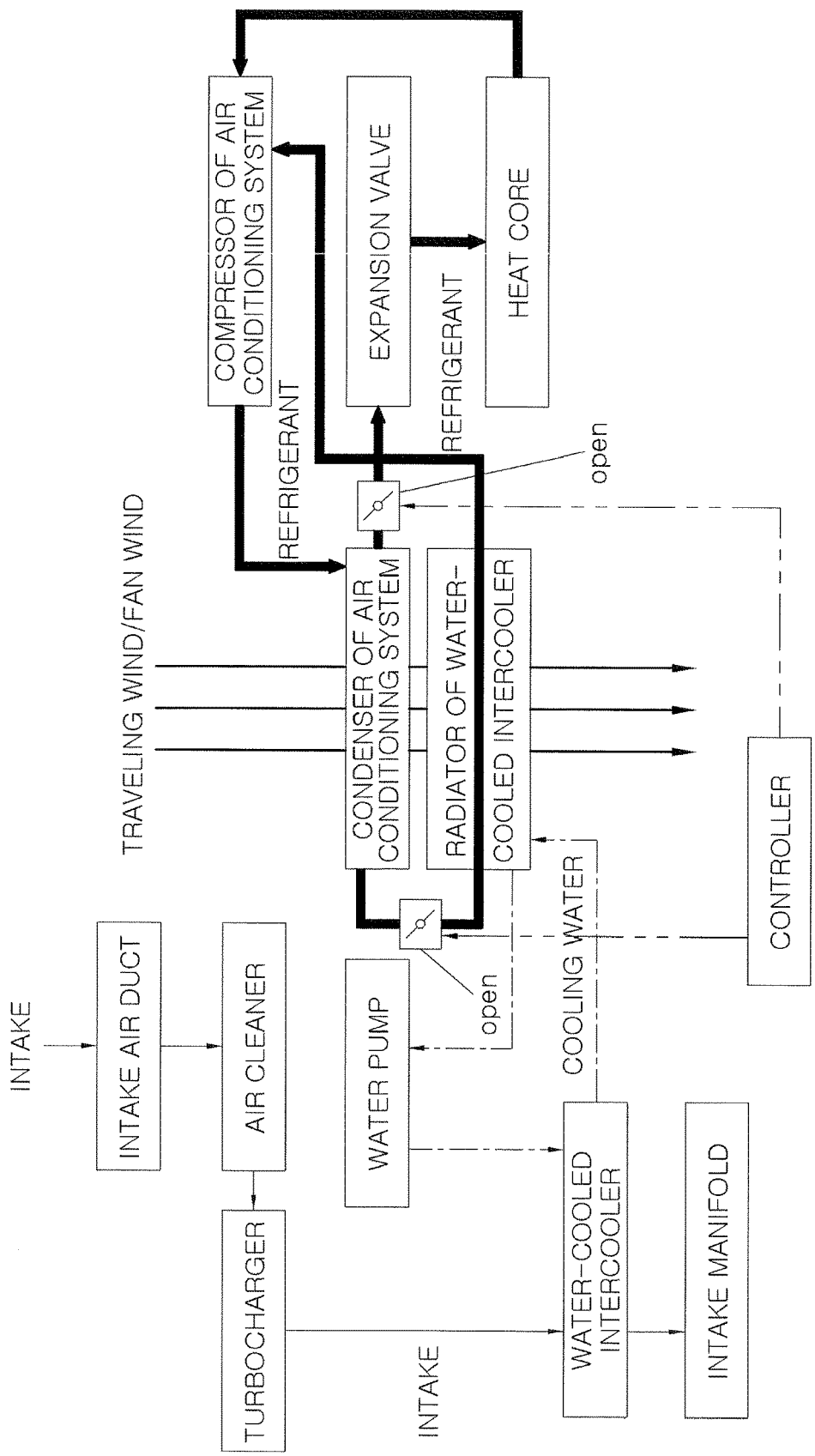
Figure 8:
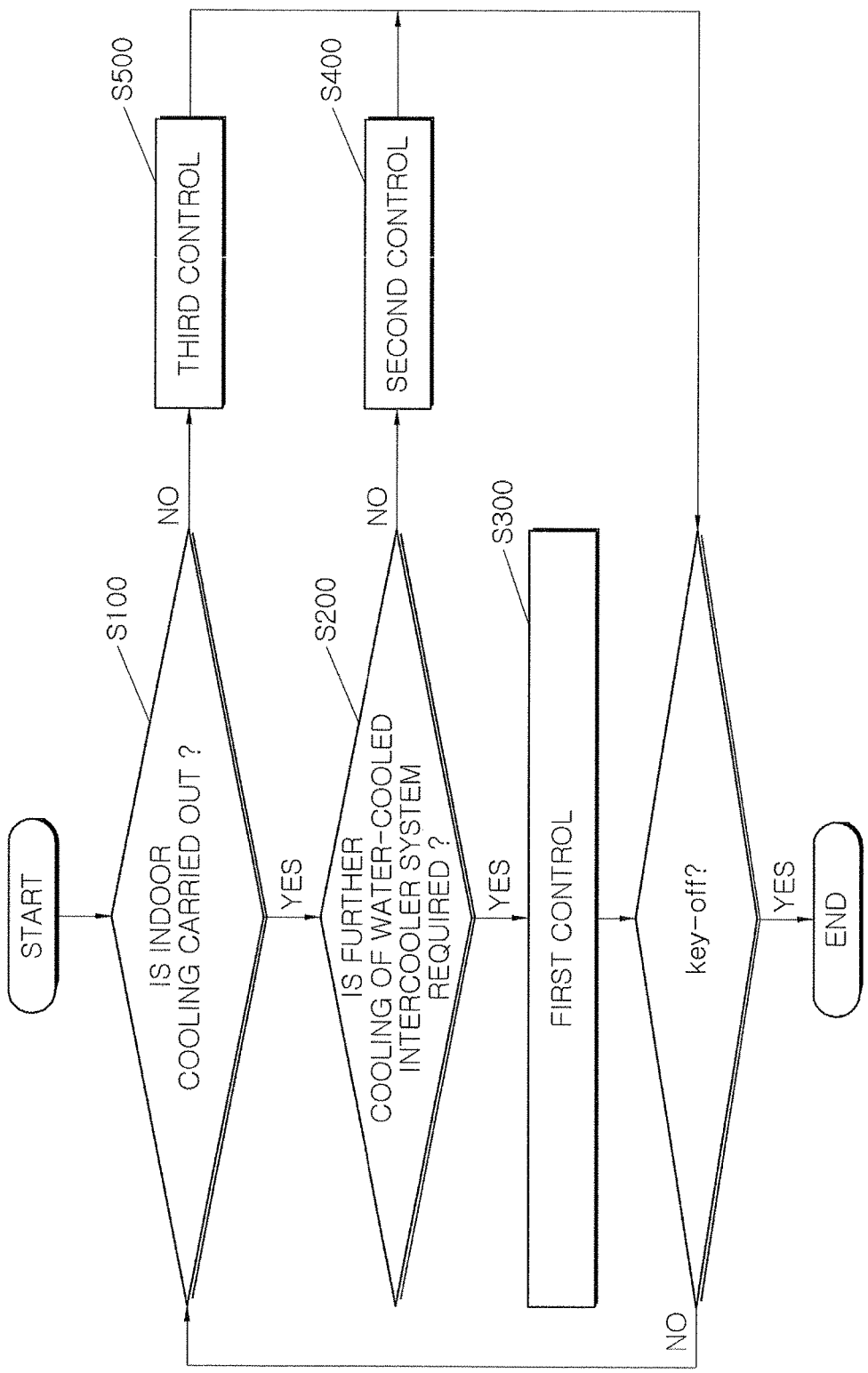
FIG. 8 is a flow chart of a method of controlling a water-cooled intercooler system using an air conditioning system according to another embodiment of the present invention.

FIGS. 5 to 7 are diagrams illustrating operation state of a water-cooled intercooler system using an air conditioning system according to an exemplary embodiment of the present invention and FIG. 8 is a flow chart of a method of controlling a water-cooled intercooler system using an air conditioning system by a controller, according to another embodiment of the present invention. The term "controller" refers to a hardware device including a memory and a processor configured to execute one or more steps interpreted as an algorithm structure. The memory stores algorithm steps, and the processor specifically executes the algorithm steps to perform one or more processes to be described in FIGS. 5-8.

Referring to FIGS. 5 to 7, a method of controlling a water-cooled intercooler system using an air conditioning system, according to another embodiment of the present invention, includes steps of: determining whether indoor cooling is in the process of being carried out (S100), determining whether if the indoor cooling is in the process of being carried out, it is required to perform further cooling of cooling water of the water-cooled intercooler system (S200), and opening a first valve and a second valve when it is determine to require the further cooling of the cooling water of the water-cooled intercooler system (S300).

In addition, the method is characterized in that if temperature of intake air at an outlet of the water-cooled intercooler is equal to or higher than a predetermined reference temperature at the determining step S200, it is determined that the further cooling of the cooling water of the water-cooled intercooler system is required. That is, as the air (i.e., intake air) compressed by a turbocharger is heated to a higher temperature, if such air is fed into combustion chambers as it is, an increasing rate of air density decreases and thus, charging efficiency is decreased or knocking is caused. Therefore, in order to prevent such phenomenon, determining whether the further cooling of the cooling water is required is carried out based on comparison between the temperature of intake air at the outlet of the water-cooled inter cooler and the predetermined reference temperature. In this case, the predetermined reference temperature is a temperature that decreases charging efficiency or causes knocking and may be set depending on types of vehicles.

Further, opening the first and second valves is carried out at the first control step S300 (see FIG. 7). Accordingly, a portion of refrigerant in a liquid state condensed in the condenser 210 of the air conditioning system passes through a radiator 130 of the water-cooled intercooler through the bypass line 230, and then further cools the cooling water in a surge tank 131 of the radiator 130 of the water-cooled intercooler. At the same time, a portion of refrigerant in a liquid state condensed in the condenser 210 of the air conditioning system is supplied to the expansion valve 240 and then vaporizes in the heat core 260, thereby indoor cooling of a vehicle is accomplished.

The method of controlling a water-cooled intercooler system using an air conditioning system further includes a second control step S400 of closing the first valve and opening the second valve when it is determined at the determining step S200, that the further cooling of the cooling water of the water-cooled intercooler system is not required (see FIG. 5).

That is, if temperature of intake air is less than the predetermined reference temperature and thus, no further cooling of the cooling water is required, all of the refrigerant in a liquid state condensed in the condenser 210 of the air conditioning system is supplied to the expansion valve 240 and then vaporizes in the heat core 260, and in doing so, it is used for cooling the interior of a vehicle. Accordingly, efficiency of cooling the interior of a vehicle is increased.

The method of controlling a water-cooled intercooler system using an air conditioning system further includes a third step S500 of opening the first valve and closing the second valve when it is determined, at the step S100 of determining whether the indoor cooling is in the process of being carried out, that the indoor cooling is not in the process of being carried out (see FIG. 6).

That is, if it is determined that the indoor cooling is not in the process of being carried out, it is allowed to make heat exchange between all of the refrigerant in a liquid state condensed in the condenser 210 of the air conditioning system and the cooling water in the surge tank 131 of the radiator 130 of the water-cooled intercooler. Therefore, it is possible to enhance cooling efficiency of the water-cooled intercooler to the maximum by opening the first valve and closing the second valve, so that power and fuel economy performance of an engine can be enhanced.

In particular, the method of controlling the water-cooled intercooler system using the air conditioning system is performed by repeating the step S100 of determining whether the indoor cooling is in the process of being carried out, the step S200 of determining whether the further cooling is required and control step S300, S400 or S500 until key-off. Therefore, it is possible to continuously control the water-cooled intercooler system during key-on state, so that power and fuel economy performance of an engine can be enhanced.

As described above, according to an exemplary embodiment of the present invention, it is possible to enhance cooling efficiency of the water-cooled intercooler, so that power and fuel economy performance of an engine can be enhanced.

In addition, with a stable temperature of intake air provided in combustion chambers of an engine, it is possible to reduce knocking phenomenon of the engine.

Further, it is possible to reduce opening portion of a front bumper as the cooling efficiency of the intercooler is increased, so that fuel economy can be enhanced by reducing air resistance and the degree of freedom of design can be increased.

While the present invention has been described with respect to the specific embodiments, it will be apparent to those skilled in the art that various changes and modifications may be made without departing from the spirit and scope of the invention as defined in the following claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A water-cooled intercooler system using an air conditioning system, the water-cooled intercooler system comprising:
    a water-cooled intercooler for cooling intake air compressed in a turbocharger by cooling water;
    a water pump supplying the cooling water to the water-cooled intercooler;
    a radiator fluidically communicating with the water-cooled intercooler and cooling the cooling water by traveling wind or fan wind to the radiator;
    a bypass line fluidically connecting a condenser of the air conditioning system and a compressor of the air conditioning system and mounted to pass through an interior of a surge tank of the radiator.

2. The water-cooled intercooler system of claim 1, further comprising a first valve mounted in the bypass line and selectively opening or closing the bypass line by a controller.

3. The water-cooled intercooler system of claim 1, further comprising an expansion line fluidically connecting the condenser of the air conditioning system and an expansion valve.

4. The water-cooled intercooler system of claim 3, further comprising a second valve mounted in the expansion line and selectively opening or closing the expansion line by a controller.

5. The water-cooled intercooler system of claim 3, further comprising an evaporation line fluidically connecting the expansion valve and a heat core.

6. The water-cooled intercooler system of claim 5, further comprising a compression line fluidically connecting the heat core and the compressor of the air conditioning system.

7. The water-cooled intercooler system of claim 6, further comprising a condensation line fluidically connecting the compressor of the air conditioning system and the condenser of the air conditioning system.

* * * * *